Fig. 2ᵃ

INVENTOR.
H. S. Osborne
BY
ATTORNEY

Patented June 3, 1924.

1,496,014

UNITED STATES PATENT OFFICE.

HAROLD S. OSBORNE, OF NEW YORK, N. Y., ASSIGNOR TO AMERICAN TELEPHONE AND TELEGRAPH COMPANY, A CORPORATION OF NEW YORK.

MULTICHANNEL CIRCUITS.

Application filed July 16, 1919. Serial No. 311,301.

*To all whom it may concern:*

Be it known that I, HAROLD S. OSBORNE, residing at New York, in the county of New York, and State of New York, have invented certain Improvements in Multichannel Circuits, of which the following is a specification.

This invention relates to signaling systems, and its object is to provide a system of circuits which will give a plurality of channels of communication over a single pair of conductors with a minimum of interference between the different channels, and with a minimum energy loss to the different channels and minimum expense for apparatus.

Figure 1:
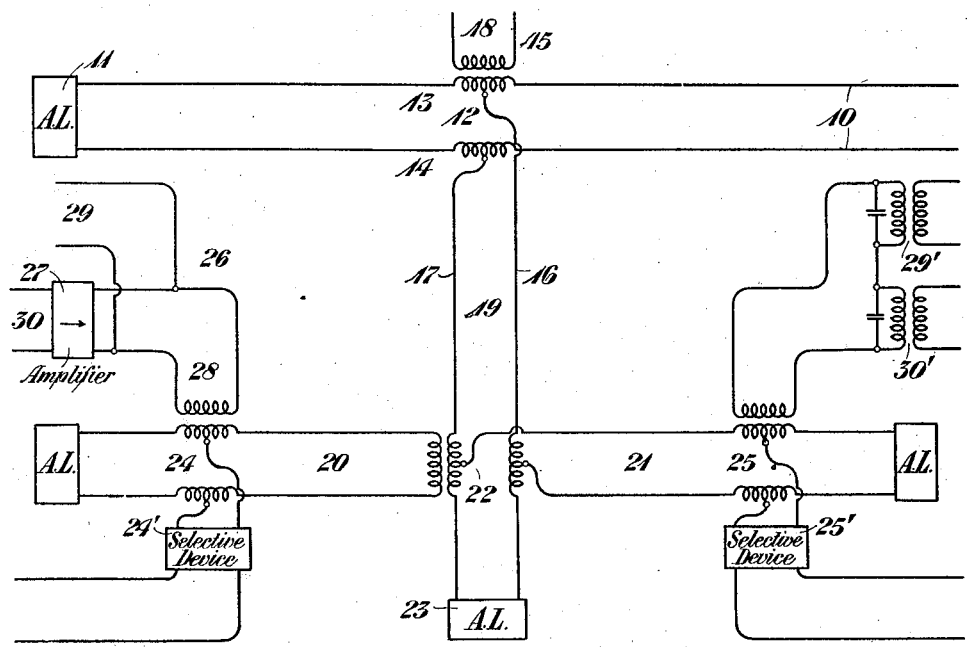
Figure 2:
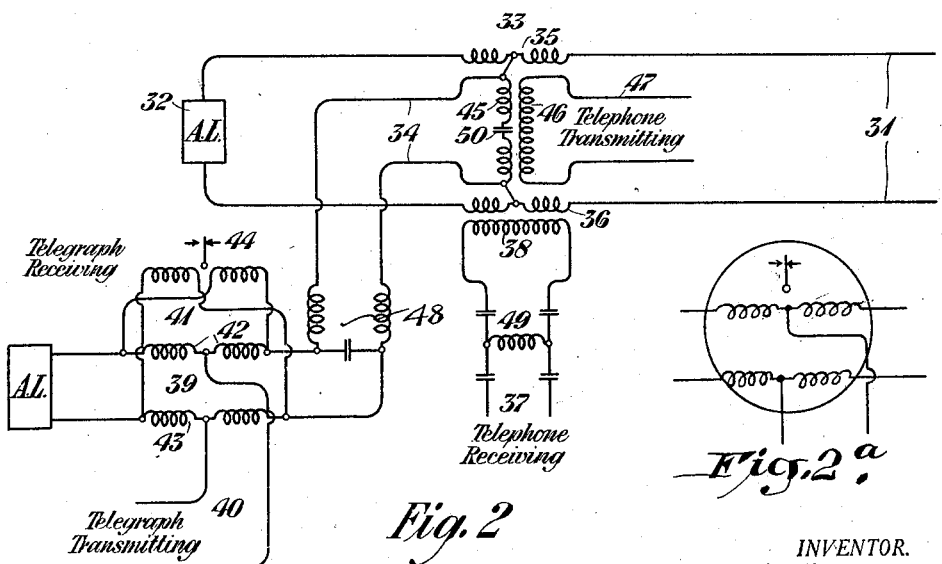
Figure 3:
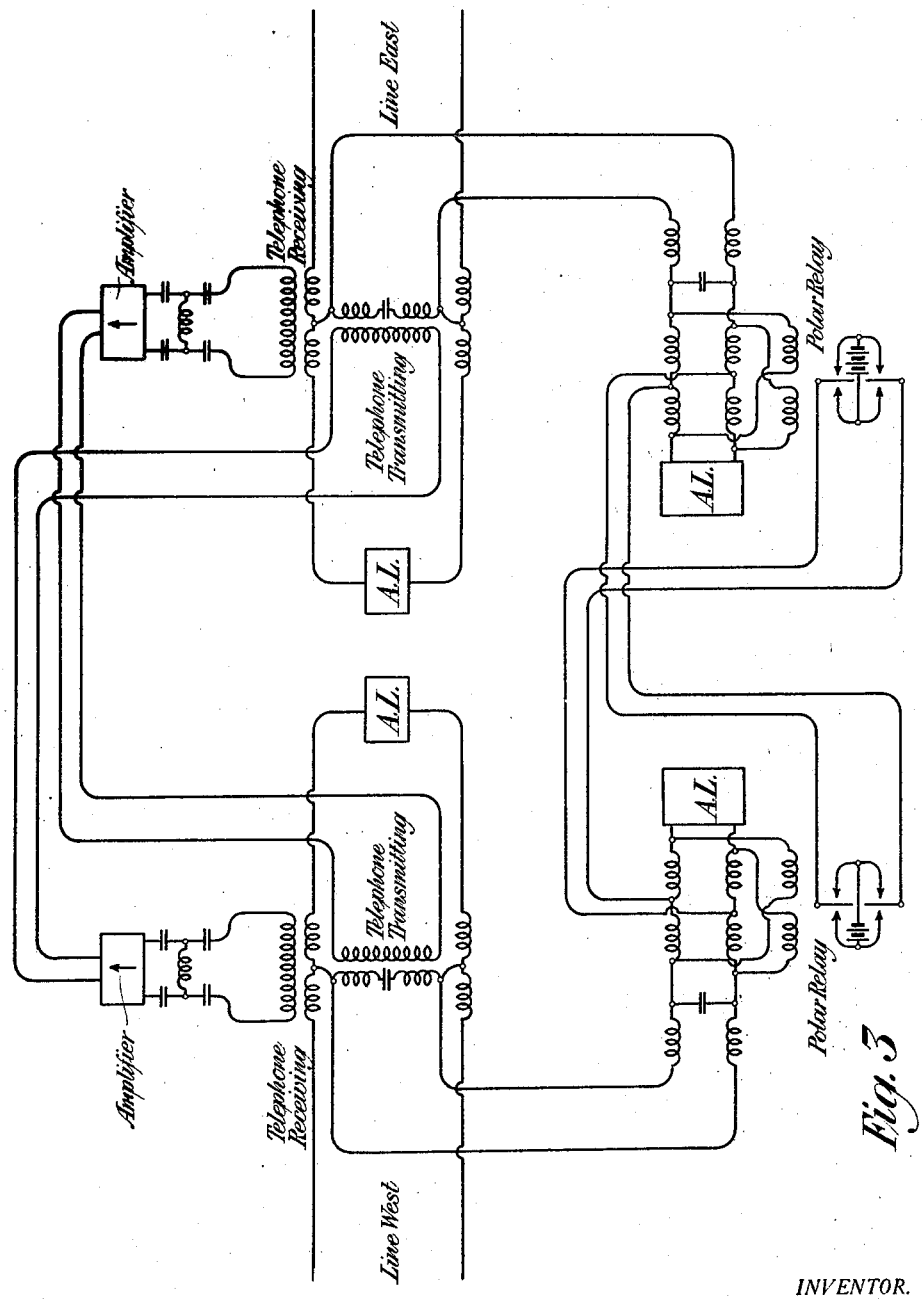

In the accompanying drawings, Figure 1 illustrates diagrammatically a set of circuits embodying the invention, Fig. 2 illustrates a modification applied to a special use, Fig. 2ª represents a variation of Fig. 2, and Fig. 3 shows the invention applied at a repeater point using two-way two-repeater sets.

Referring to Fig. 1, the main line conductors are indicated at 10. This is here shown as a metallic circuit, but in some instances may equally well be a grounded circuit. The artificial line 11 is provided to balance the main line 10, and at the point of balance a three-limb transformer 12 is introduced. The structure of such transformers is now well known, being commonly used in two-way two-repeater circuits and other like locations. It is provided with three windings, one in each side of the main line as shown at 13 and 14 respectively, and one in a circuit inductively related to these two, as shown at 15. Leads 16 and 17 are then taken off at the central point of the windings 13 and 14 respectively. Such an arrangement provides two circuits, 18 and 19, which are conjugate with respect to each other; that is, current flowing in either one toward the main line 10 will not enter or affect the other.

Each of the branches 18 and 19 may again be divided into two branches in like manner. Thus the branch 19 is shown on the drawing as itself divided into branches 20 and 21 by the use of a similar three-limb transformer 22 and a balancing artificial line 23. And the branches 20 and 21 may be again divided as at 24 and 25 into conjugate branches by a similar use of transformers and artificial lines; and the branching thus continued until the desired number of channels is provided. The artificial line thus introduced at any point in the system of branching circuits should balance the entire line up to the point of branching with which it is associated.

Each of the branches and sub-branches provided by this arrangement is a two-way channel and may be used for any purpose for which such a channel is adapted. The relation between the various branches in such a system is such that the currents transmitted from any channel to the common line will not interfere with the currents received on, or transmitted from any other channel. It will be seen, however, that currents coming in from the common line will divide into all of the individual channels unless means is provided for preventing it. Where it is desired, therefore, to use certain of the branches for receiving, it will in general be necessary to provide them with selective devices for separating incoming signals and confining each to the channel or channels for which it is intended. Devices of this kind are now well known in the art, and are indicated diagrammatically in Fig. 1 at 24' and 25'. They may be wave filters, simple tuned circuits or other selective devices depending upon the character of the currents dealt with.

As above noted, the various branches of the described system are two-way channels, but may be made one-way channels in any instance by the insertion of unilateral devices such as amplifiers of the thermionic or other known types. This is advantageous as a means of reducing interference, especially when further branching of the circuit at the amplifier is desirable. Such an arrangement is illustrated in Fig. 1 at 26 where an amplifier 27 is introduced into the branch 28. The amplifier transmits energy only in the direction of the arrow. Therefore, by connecting a branch circuit 29 to the output side of the amplifier, currents transmitted from the circuit 29 can have no effect upon apparatus connected to the circuit 30 on the input side of the amplifier. Since the circuits 29 and the output side of the amplifier are connected directly in a parallel they will, as above noted, ordinarily be provided with selective devices (omitted from the drawing for the sake of simplicity) for preventing the current of circuit 29 from being dissipated in the amplifier output circuit and the current from the amplifier from entering circuit 29 thus avoiding waste and interference. The arrangement last described is of particular value when the circuit 28—30 represents one side of a two-way two-repeater circuit.

Instead of branching one or more of the circuits in parallel to provide additional channels as at 29, 30 a similar result may be obtained by a series arrangement as shown at 29', 30' in one of the conjugate branches of circuit 21.

Fig. 2 represents the application of the branching system above described to a metallic circuit carrying both telephone and telegraph currents. The main line 31 is balanced by an artificial line 32, with a three-limb transformer 33 at the point of balance for providing conjugate circuits as above described. The circuit 34, leading from the center points of the main line windings 35 and 36 of the transformer 33 may be regarded as corresponding to the circuit 19 of Fig. 1, and the circuit 37 which includes the third winding 38 of the transformer, as corresponding to the circuit 18 of Fig. 1. The circuit 34 is again divided at 39 into two branches 40 and 41 by means equivalent to those already described. In this instance, however, the branch 41 is shown as conductively related to the circuit 34 instead of inductively, as in the circuit shown in Fig. 1. This may be accomplished by shunting the coils 42 and 43 in the branch 34 by separate circuits which cooperate to effect the desired result—in this case the operation of a telegraph relay or receiving device 44.

The center points of the coils 35 and 36 in the main line are here shown as connected by a transformer winding 45 which co-operates with another winding 46 to provide a third branch circuit 47 at the point 33, circuits 34 and 47 being in parallel across the circuit 31. The arrangement shown, therefore, provides four branches from the main line which may, if desired, be used for telephone transmitting, telephone receiving, telegraph transmitting and telegraph receiving, as indicated on the drawing. When the circuits are so used, it is desirable to insert into certain of the branches frequency selective devices for separating the telephone and telegraph currents. Since in the arrangement shown, the telegraph currents all enter the branch 34, the frequency selective apparatus for excluding the telephone currents may be located in this branch, as indicated at 48. A high pass filter 49 will be located in the telephone receiving circuit 37. For the telephone transmitting branch a condenser 50 connected between the halves of the transformer winding 45 will serve the purpose. The devices 48, 49 and 50 perform the function of the familiar composite apparatus, whose operation is well understood.

It is obvious that parallel branching circuits such as shown at 34 and 47 may be made at any of the branching points in Fig. 1, and manifestly a branch parallel to the circuit 37 might also be used if desired. The parallel branching of the various branch circuits is, moreover, of course, not limited to the points at which the three-winding transformers are used. As indicated in Fig. 1 any one of the branches may be divided into any desired number of parallel or series circuits by simple metallic connections. These, however, to serve the purpose of separate channels individual to different signaling currents would as above stated require selective devices in each for affecting both the incoming and outgoing currents. If desired, also, the coils 35—36 in the main circuit 31, or the coils 42—43 in the branch circuit 34 may themselves serve as the coils of a telegraph relay or other instrument as well as the purposes hereinabove described. Thus, the separate circuits shunting the coils 42 and 43, may, if desired, be omitted and the telegraph receiving circuit of Fig. 2 may be directly represented by either of the two sets of coils mentioned, as indicated in Fig. 2ᵃ.

Fig. 3 shows the arrangement of Fig. 2 applied to a repeater point as distinguished from a terminal point on the line. It will be seen that it consists of a duplication of the circuits of Fig. 2 with one arranged to feed into the other and with amplifiers or repeating relays taking the place of the terminal receiving and sending apparatus. The applicability of the more simple branching arrangements of Fig. 1 to repeater points will be obvious.

By the arrangements herein described it will be obvious that any desired number of channels may be provided from a single pair of conductors, the limitations in any case being the loss incident to the use of the artificial lines and the sufficiency of the selective devices, where used, to separate the received currents in the various channels to the required degree. Where the branch circuit is tapped off from the center of the coils in the main circuit, as indicated in the drawings, one-half of the energy of each channel is lost at each branching point. The loss may, however, be reduced in either channel and increased in the other in any desired ratio by connecting the shunt channel to other than the midpoints of the windings of the branching transformer, and correspondingly changing the impedance of the balancing artificial line. A saving in energy loss similar to that which may be obtained by the use of selective devices for the separate channels, can be obtained by making the balancing artificial lines themselves selective for frequency, balancing at certain frequencies only and having a high or low impedance for other frequencies as required for small transmission losses. Current from the channel using a frequency not balanced can be excluded from the other circuit, or circuits by the use of selective devices in such circuits. Thus in Fig. 1 the circuit 21 may be balanced by its artificial line only for the frequencies used in the lower branch, the frequencies of the upper branch being excluded from the lower branch by the selective device 25'.

Selective apparatus adequate to separate the weak incoming currents of different frequencies would often be quite inadequate to prevent the strong transmitted currents from interfering with the received currents. By using the arrangements hereinabove described and reducing the amount of frequency selective apparatus to that required for separating the received currents from each other, it is often possible to superpose channels of communication where without this invention the channels would mutually interfere.

It will be understood that the invention is not limited to the particular arrangement of circuits herein shown and described, as various modifications within the spirit of the disclosed invention and the scope of the appended claims will readily suggest themselves.

What is claimed is:

1. The method of preventing interference between a plurality of transmitting channels connected to a single line, which consists in uniting the currents from two transmitting channels while causing each current to produce two equal and opposed effects in the channel of the other, uniting said combined currents with current from another channel while causing the said combined currents and the current from said other channel to cause two equal and opposed effects in the channel of the other respectively, and so on until the desired number of transmitting currents are imposed upon the line.

2. A system for providing terminal separation for a number of channels of communication using the same pair of conductors, comprising means for dividing the line into a plurality of branches conjugate for outgoing currents, means for subdividing one or more of said branches to provide a plurality of circuits conjugate for outgoing currents, and means for excluding from each receiving channel all incoming currents except those intended for receiving apparatus located therein.

3. A multi-channel transmission line comprising a main line, an artificial line for balancing the main line, means co-operating with the artificial line for dividing the main line at the point of balance into one or more pairs of conjugate branch circuits, and an artificial line in one or more of the branch circuits, and means co-operating with said last mentioned artificial line, or lines, for dividing the said branch circuit or circuits into conjugate pairs of circuits.

4. A multi-channel transmission line comprising a main line, means for dividing said main line into a plurality of conjugate branch circuits, and means for dividing one or more of said branch circuits into a plurality of conjugate sub-branch circuits.

5. A multi-channel transmission line comprising a main line, means for dividing said main line into a pair of conjugate branch circuits, and means for dividing one or both of said branch circuits into a pair of conjugate sub-branch circuits.

6. A multi-channel transmission line comprising a main line, means for dividing said main line into a plurality of conjugate branch circuits, means for dividing one or more of said branch circuits into a plurality of conjugate sub-branch circuits and selective devices located in certain of the branch or sub-branch circuits for separating incoming signal currents into their appropriate receiving circuits.

7. In a signaling circuit, a main line, an artificial line for balancing the main line, means co-operating with the artificial line for dividing the main line into two conjugate branch circuits, one of said branch circuits being divided into two parallel circuits and a unidirectional device located in one of said parallel circuits for preventing current from one of them from entering the other.

In testimony whereof, I have signed my name to this specification this fourteenth day of July 1919.

HAROLD S. OSBORNE.